United States Patent
Vas et al.

(10) Patent No.: US 11,659,076 B2
(45) Date of Patent: May 23, 2023

(54) INITIATING APPLICATION EXECUTION WITH TRIGGER CHARACTERS

(71) Applicant: AirWatch LLC, Atlanta, GA (US)

(72) Inventors: Sachin Vas, Bangalore (IN); Sushilvas Vasavan, Bangalore (IN)

(73) Assignee: AirWatch LLC, Atlanta, GA (US)

( * ) Notice: Subject to any disclaimer, the term of this patent is extended or adjusted under 35 U.S.C. 154(b) by 95 days.

(21) Appl. No.: 17/366,455

(22) Filed: Jul. 2, 2021

(65) Prior Publication Data
US 2021/0337059 A1    Oct. 28, 2021

Related U.S. Application Data

(63) Continuation of application No. 15/417,247, filed on Jan. 27, 2017, now Pat. No. 11,076,034.

(30) Foreign Application Priority Data

Dec. 6, 2016 (IN) .............................. 201641041713

(51) Int. Cl.
  *H04M 1/72403* (2021.01)
  *H04L 51/08* (2022.01)
  *H04M 1/7243* (2021.01)
  *G06F 9/48* (2006.01)

(52) U.S. Cl.
  CPC ...... *H04M 1/72403* (2021.01); *G06F 9/4843* (2013.01); *H04L 51/08* (2013.01); *H04M 1/7243* (2021.01)

(58) Field of Classification Search
  CPC .......... H04M 1/72522; H04M 1/72547; G06F 9/4843; H04L 51/08
  See application file for complete search history.

(56) References Cited

U.S. PATENT DOCUMENTS

| | | | |
|---|---|---|---|
| 8,286,085 B1 * | 10/2012 | Denise | G06Q 10/107 715/752 |
| 9,009,162 B1 | 4/2015 | Luo | |
| 9,336,192 B1 | 5/2016 | Barba et al. | |
| 2002/0065820 A1 | 5/2002 | Enns | |
| 2012/0066212 A1 | 3/2012 | Jennings | |
| 2012/0072559 A1 * | 3/2012 | Alzamil | G06Q 50/01 709/222 |
| 2014/0173460 A1 | 6/2014 | Kim | |

(Continued)

*Primary Examiner* — Stephen S Hong
*Assistant Examiner* — Ahamed I Nazar
(74) *Attorney, Agent, or Firm* — Thomas | Horstemeyer, LLP

(57) ABSTRACT

Disclosed are various embodiments for initiating execution of an application using trigger characters. In one embodiment, a computing device detects an entry of a trigger character in an input field of a first user interface presented by a first application. The input field is specified for detection of the individual trigger character based on a trigger rule for the first application. The computing device then identifies a string following the trigger character. The computing device then determines that the string matches a name of a second application installed on the computing device based on a list of applications installed on the computing device. The computing device then initiates execution of the second application. Subsequently, the computing device switches from the first user interface to a second user interface presented by the second application.

20 Claims, 5 Drawing Sheets

(56) References Cited

U.S. PATENT DOCUMENTS

| | | | |
|---|---|---|---|
| 2014/0279543 A1* | 9/2014 | Ruhrig | G06Q 20/223 |
| | | | 705/44 |
| 2016/0315995 A1* | 10/2016 | Häusler | G06F 40/279 |
| 2016/0328401 A1 | 11/2016 | Dhawan et al. | |
| 2017/0132200 A1* | 5/2017 | Noland | G06F 40/186 |
| 2017/0169026 A1 | 6/2017 | Nalliah et al. | |

\* cited by examiner

INITIATING APPLICATION EXECUTION WITH TRIGGER CHARACTERS

CROSS-REFERENCE TO RELATED TO RELATED APPLICATION

This application is a continuation of and claims the benefit of U.S. patent application Ser. No. 15/417,247, entitled "INITIATING APPLICATION EXECUTION WITH TRIGGER CHARACTERS" and filed Jan. 27, 2017, which is hereby incorporated by reference in its entirety.

BACKGROUND

Mobile computing devices, such as smartphones and tablet computers, are often configured to execute applications in isolation of each other by default. For example, Apple's iOS® operating system is configured to execute each application in a separate sandboxed environment. As a consequence, applications are often, by default, unable to communicate or share data with each other. For example, files saved by one application may not be visible or available to another application. As another example, interprocess communications between applications may be prohibited by default.

Some operating systems, however, provide mechanisms for separate applications to communicate with each other. For example, in iOS, applications can optionally implement extensions. In iOS, extensions provide an interface for a second application to send data to or interact with the application implementing an extension. For example, an electronic mail (e-mail) application could implement an extension allowing other applications to create a new e-mail message with a file attached or to create a new e-mail message to a particular person.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for accessing a user interface of a second application from within a user interface of a first application. For example, in iOS, an application may implement an extension that allows other applications to communicate with it. For instance, an e-mail application could implement an extension that allows a document storage application or another document provider application to create a new e-mail message with a file attached. This functionality can be accessed from within the document storage application, for example, by selecting a file and then selecting an option to attach the file to an email. Accordingly, the document storage application, document provider, or similar document storage application is able to push, provide, or otherwise send the file to the e-mail application. In some instances, the document storage application can also trigger the user interface of the email application to open in order for the user to input addresses of the recipients, a subject, a message, and other data. However, a user within the e-mail application would not necessarily be able to attach or request a document from the document storage application because application extensions do not provide for bi-directional communication. So, while an application in iOS that implements an extension can receive information from another application, it cannot request or retrieve information from the other application.

As an example, if the user had the email application open in iOS, the user would not be able to request a file from a second application, such as a document storage application, to attach to an email message. Instead, the user would have to exit the email application and open the document storage application to access a file for attachment to an email message. The user would then need to select the file in the document storage application and select the extension provided by the e-mail application to attach the file to an e-mail. This could then trigger the e-mail application to relaunch with a new message window already displayed and the selected file already attached to the new e-mail. Various embodiments of the present disclosure simplify this workflow. In the following discussion, a general description of the system and its components is provided, followed by a discussion of the operation of the same.

Figure 1A:
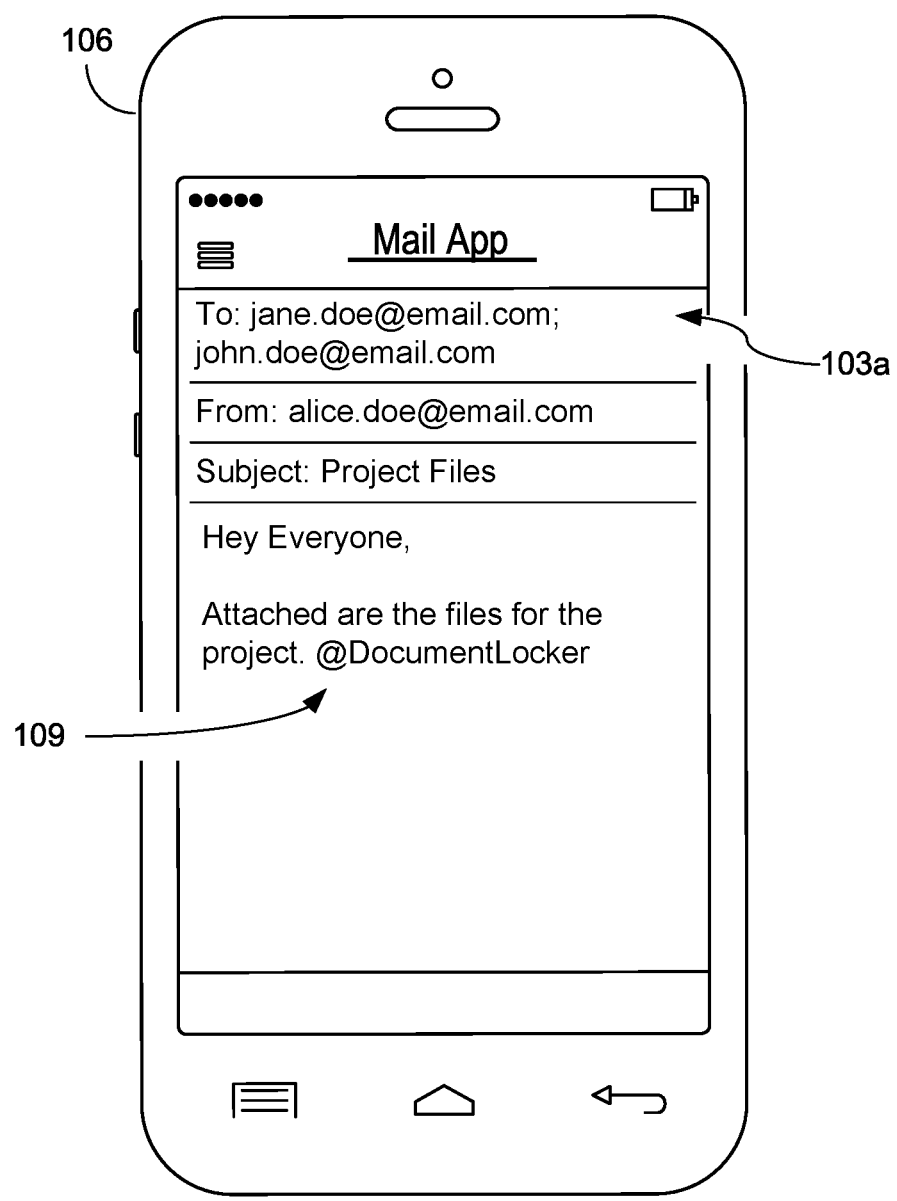
FIG. 1A depicts an example of a user interface.

FIG. 1A depicts a first user interface 103a provided by an e-mail application executing on a mobile computing device 106. For example, the first user interface 103a could correspond to a message composition interface of the e-mail application bundled with iOS. Within the first user interface 103a are a number of user interface elements, such as field for listing recipients, a field listing the sender's email address, a field for the subject of the e-mail, and a field for the body of the e-mail. Within the body of the email, a user has entered a trigger character 109, followed by a string that identifies a name of a second application (e.g., "DocumentLocker") installed on the mobile computing device 106. Although the depicted trigger character 109 is the "@" symbol, any text character could be used and different text characters could be used and may be more appropriate in different contexts. For example, some embodiments may use non-alphanumeric characters (e.g., punctuation marks, symbols, etc.) because they are used less frequently than letters and numbers. As later described, entry of the trigger character 109 causes the specified application to be launched, allowing a user to launch a second application from within the user interface of a first application.

In the example depicted in FIG. 1A, the user is composing an e-mail to several recipients and wishes to attach several files to the e-mail. In order to access the files, the user has entered the trigger character 109, followed by the name of the application where the files can be accessed (e.g., "Document storage application"). This allows a user to directly open a second application from within a first application.

Figure 1B:
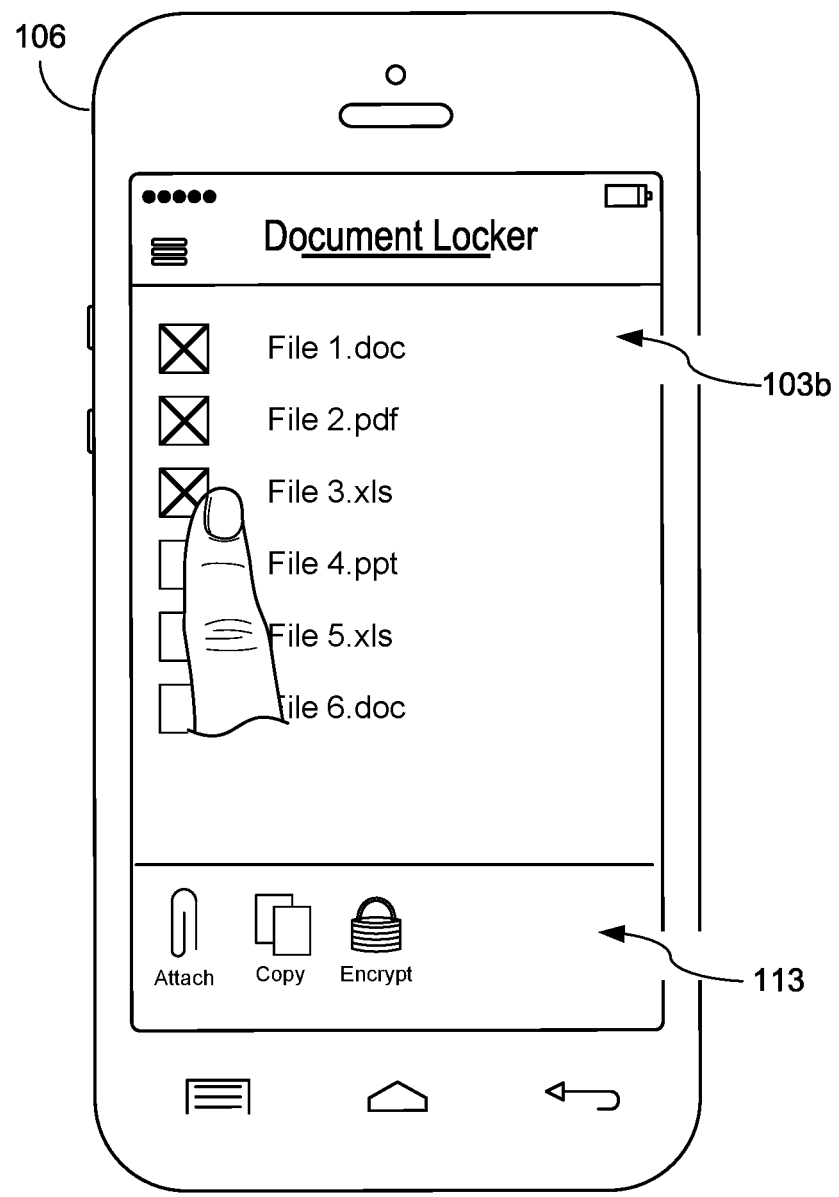
FIG. 1B depicts an example of a user interface.

FIG. 1B depicts a second user interface 103b of a second application, such as a document storage application, installed on the mobile computing device 106. As depicted, the user is able to select several files. A list of potential actions 113 provided by the e-mail application through an application extension is also shown. The user could then, for example, select the "Attach" action 113 to attach the selected files to the email the user was composing previously in FIG. 1A.

Figure 1C:
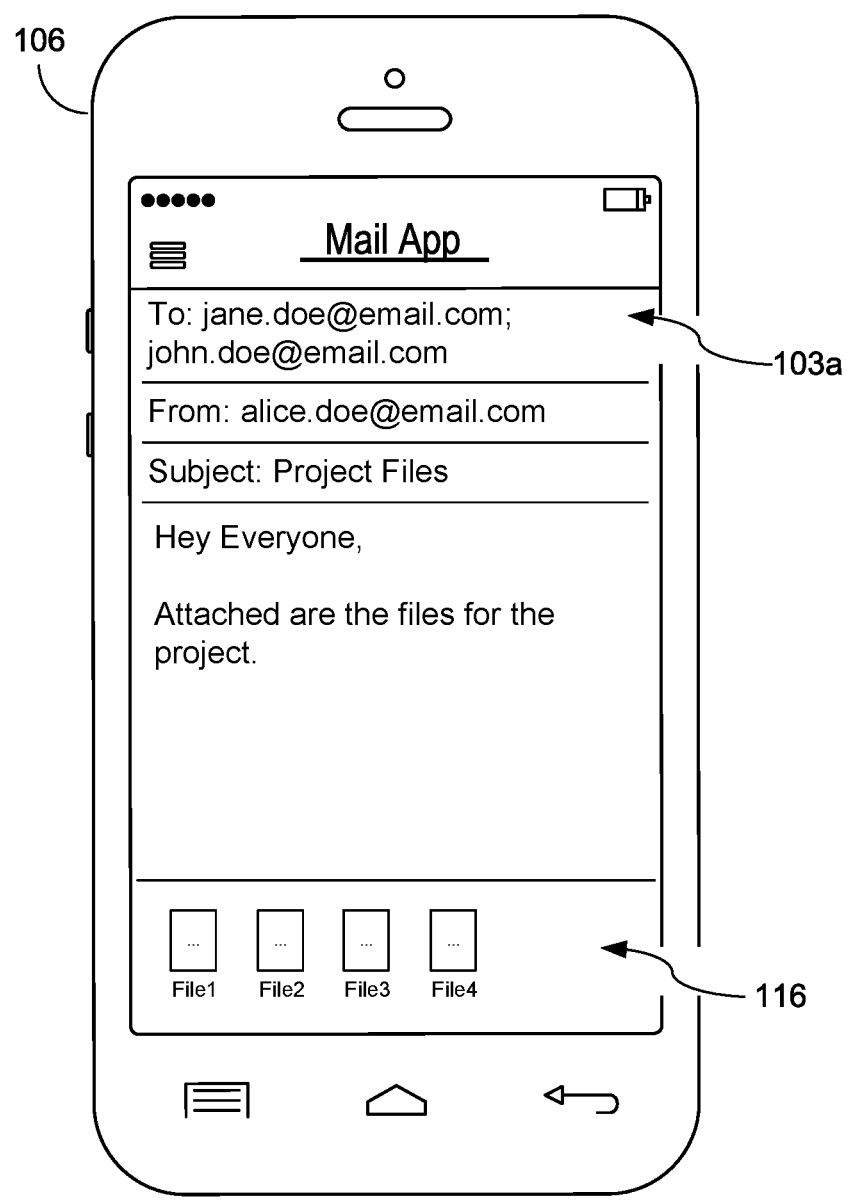
FIG. 1C depicts an example of a user interface.

FIG. 1C depicts a user interface 103a of the first application after a user has selected one or more files as attachments to an email in the manner depicted previously in FIG. 1A and FIG. 1B. As depicted, a list of attached files 116 is provided at the bottom of the e-mail. These files can correspond to the files previously selected with the user interface 103b depicted in FIG. 1B.

Figure 2:
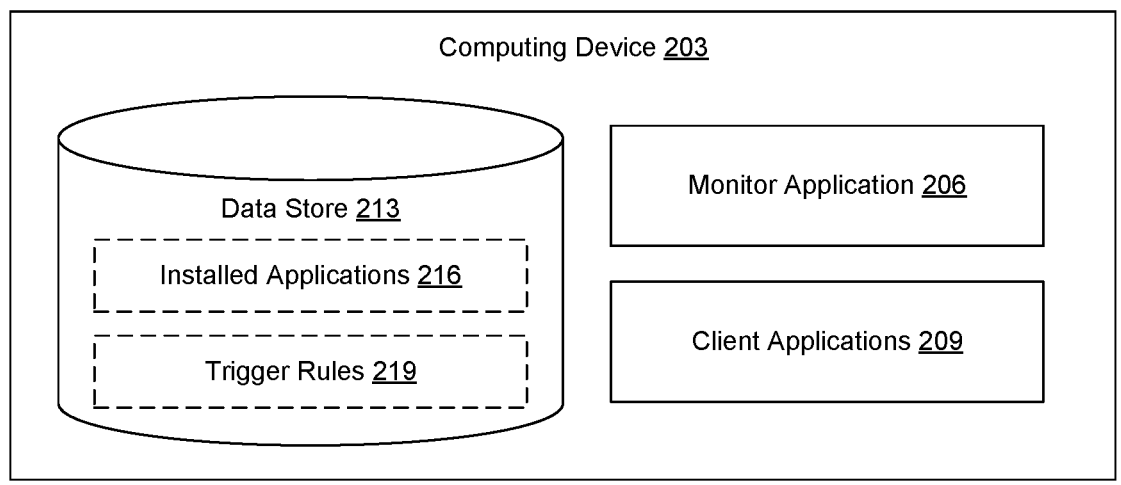
FIG. 2 depicts a computing device.

With reference to FIG. 2, shown is a computing device 203. The computing device 203 can be embodied in the form of a personal computer (e.g., a desktop computer, a laptop computer, or similar device), a mobile computing device 106 (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The computing device 203 can include one or more displays, such as liquid crystal displays (LCDs), gas plasma-based flat panel displays, organic light emitting diode (OLED) displays, electrophoretic ink ("E-ink") displays, projectors, or other types of display devices.

The computing device 203 can be configured to execute various applications such as a monitor application 206, one or more client applications 209, or other applications. The monitor application 206 is executed to detect entry of a trigger character 109 in the user interface of a first client application 209 and initiate execution of a second client application 209 identified with the trigger character 109. The client applications 209 can be executed by the computing device 203, causing a user interface to be rendered on the display. To this end, client applications 209 can include, for example, a browser, an e-mail application, a social networking application, a document storage application or document storage provider, a word processor, a spreadsheet, a game, a photo editor, a calendar application, or other application.

The monitor application 206 can be configured to monitor characters entered into the user interface of an application using various approaches. As a first example, the monitor application 206 could be provided with permissions to access or view characters entered with the keyboard. For instance, various operating systems for mobile computing devices may not allow an application to view keystrokes entered through a keyboard interface unless the application has been granted permission to do so. As a second example, the client application 209 could be configured to send characters it receives from a keyboard to the monitor application 206. For example, the monitor application 206 could be integrated into the client application 209 or the client application 209 and monitor application 206 could be configured to communicate with each other via various inter-process communication mechanisms (e.g., shared files, shared memory, sockets, etc.).

Also, various data is stored in a data store 213 that is accessible to the computing device 103. The data store 213 can be representative of a plurality of data stores 213, which can include relational databases, object-oriented databases, hierarchical databases, hash tables or similar key-value data stores, as well as other data storage applications or data structures. The data stored in the data store 213 is associated with the operation of the monitor application 206, as described later. This data can include a list of installed applications 216, one or more trigger rules 219, and potentially other data.

The list of installed applications 216 includes the name of each client application 209 installed on the computing device 203. In some instances, the list of installed applications 216 can identify application groups as well as which of the installed client applications 209 are within each application group. Some systems, such as iOS, provide for applications groups, which define sets of client applications 209 that are allowed to access a common shared path or folder in a filesystem of the computing device 203. Data saved in the common shared path or folder by one client application 209 in an application group can be accessed by any other client application 209 in the same application group. Other systems may provide similar functionality.

The trigger rules 219 can be used to define specific trigger characters 109 individual client applications 209 and how trigger characters 109 should be processed for a specific client application 209. For example, a first trigger rule 219 could specify the "@" symbol as a trigger character 109 for a first client application 209 and the "$" as a trigger character 109 for a separate, second client application 209. As another example, a trigger rule 219 could specify that a trigger character 109 should only be recognized in a specific text field, user interface element, or user interface context. For instance, a trigger rule 219 for an email application could specify that a trigger character 109 should only initiate execution of a second client application 209 if the trigger character 109 is entered within the body of an e-mail.

A trigger rule 219 could also specify how a second client application 209 to be executed is identified with the trigger character 109. For example, the trigger rule 219 could specify that the string of text immediately following the trigger character is to be used to identify the client application 209 to be executed. In this example, the trigger rule 219 could also specify that the string of text is terminated with a character (e.g., a formatting character such as a space, tab, or a newline character, a punctuation mark, etc.). As a second example, the trigger rule 219 could specify a regular expression. Any string of text matching the regular expression would be a potential identifier of the client application 209 to be executed. In some instances, the trigger rule 219 can also specify how to identify arguments to be passed to a client application 209 being invoked with a trigger character 109.

To briefly describe the operation of the components of the computing device 203, the monitor application 206 detects an entry of a trigger character 109 within a first user interface presented by a first client application 209 installed on the computing device 203 (e.g., a mobile computing device 106). In some instances, the monitor application 206 can determine that the entry of the trigger character 109 is within a permitted text field within the first user interface of the first client application 209. In these instances, the monitor application 206 may ignore the trigger character 109 and decline to process the trigger character 109 unless the trigger character 109 is within a permitted text field.

The monitor application 206 then identifies a string following the trigger character 109. In some instances, the monitor application 206 can identify the string based at least in part on the entry of the trigger character 109 occurring within the permitted text field of the first user interface presented by the first client application 209. In some instances, the monitor application 206 can determine that the string matches a name of a second client application 209 installed on the computing device 203.

The monitor application 206 can then initiate execution of the second client application 209. In some instances, the monitor application 206 can further identify a second string following the trigger character 109 and provide the second string as an argument to the second client application 209. In other instances, the monitor application 206 can capture data from the first client application 209 based at least in part on the name of the second client application 209. For example, if the name of the second client application 209 corresponds to a calendar application, the monitor application 206 may capture from the first client application 209 information about a proposed event in order to prepopulate one or more fields in the calendar application. The monitor application 206 can then provide the captured data to the second client application 209.

Subsequently, the monitor application 206 may cause the computing device 203 to switch from rendering the first user interface corresponding to the first client application 209 to a second user interface presented by the second client application 209. For example, the monitor application 206 may send a signal to the first client application 209 to suspend execution. As a second example, the monitor application 206 could adjust the priority of the second client application 209 to supersede the priority of the first client application 209. As a third example, the monitor application 206 could invoke a function provided by an API of the operating system of the computing device 203 to initiate a switch from the user interface of the first application to the user interface of the second application.

Various other approaches may be used depending on the particular operating system or environment of the computing device 203.

Figure 3:
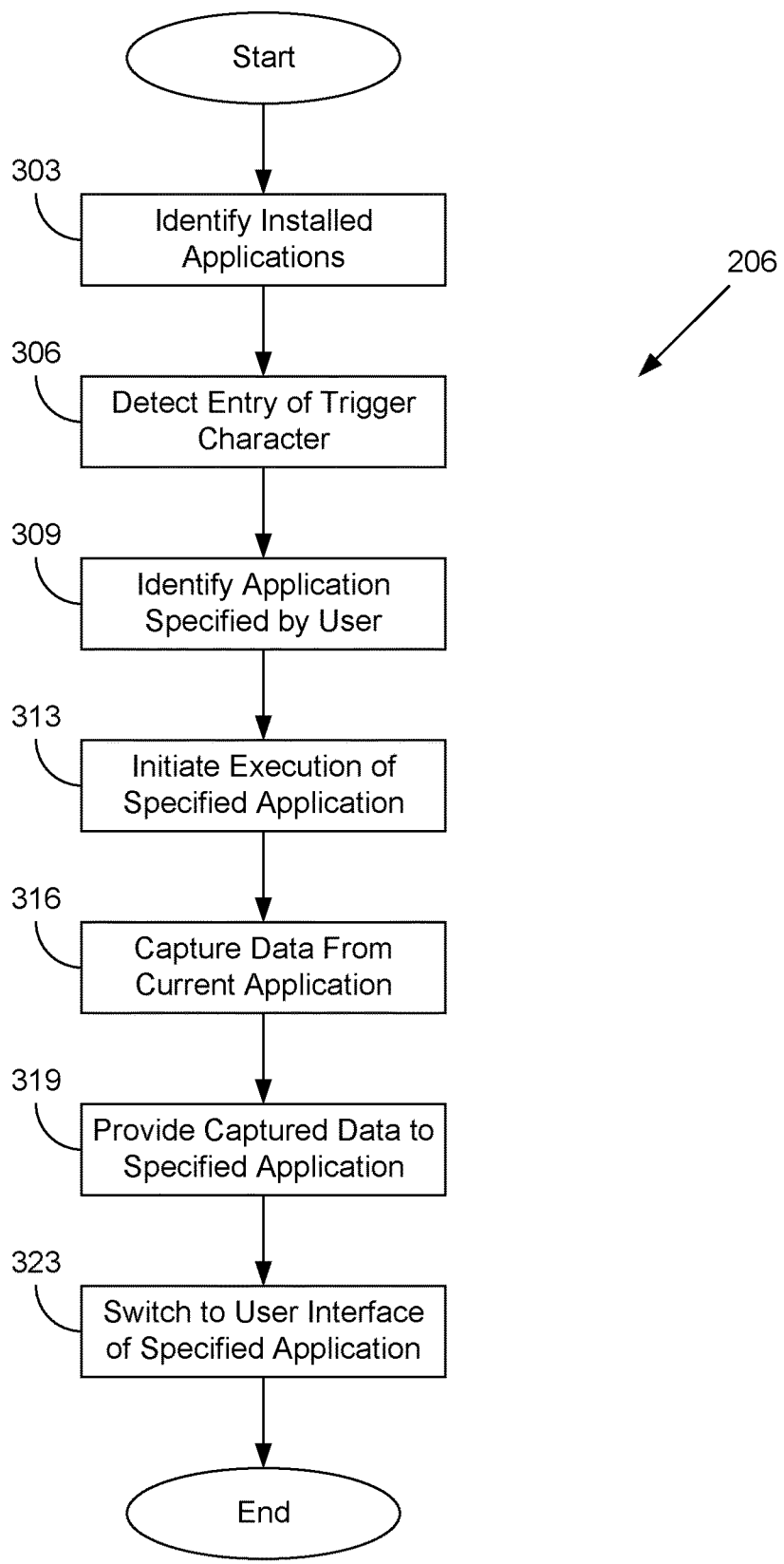
FIG. 3 depicts a flowchart of a component of the computing device of FIG. 2.

Referring next to FIG. 3, shown is a flowchart that provides one example of the operation of a portion of the monitor application 206. It is understood that the flowchart of FIG. 3 provides merely an example of the many different types of functional arrangements that can be employed to implement the operation of the monitor application 206. As an alternative, the flowchart of FIG. 3 can be viewed as depicting an example of elements of a method implemented in the computing device 203.

Beginning with step 303, the monitor application 206 identifies all of the client applications 209 currently installed on the computing device 203. For example, the monitor application 206 could query or otherwise process the list of installed applications 216 stored in the data store 213 of the computing device 203. In this example, the monitor application 206 could invoke a function available through an application programming interface (API) provided by an operating system of the computing device 203 that returns a list of all client applications 209 installed on the computing device 203. In alternative embodiments, the monitor application 206 could, for example, iterate through a filesystem location (e.g., a directory) where client applications 209 are installed in order to identify all of the installed client applications 209.

Moving on to step 306, the monitor application 206 detects the entry of a trigger character 109 within a first user interface provided by a first client application 209. In one instance, the monitor application 206 could monitor all characters entered into the first user interface and identify the trigger character 109 specified by a trigger rule 219 from the stream of characters. In another instance, the monitor application 206 could monitor the characters entered into the first user interface based at least in part on one or more criteria specified by a trigger rule 219. For example, the monitor application 206 could monitor the set of characters, if any, entered into a particular user interface element, text field, or user interface context specified by a trigger rule 219.

Proceeding next to step 309, the monitor application 206 determines that the client application 209 specified by the user with the trigger character 109 is included in the list of installed client applications 209 previously identified at step 303. For example, the monitor application 206 could parse the text entered by the user in the manner specified by a respective trigger rule 219. For instance, the monitor application 206 could extract the characters immediately following the trigger character 109 through a terminating character specified by the trigger rule 219 (e.g., a formatting character such as a space, tab, or a newline character, a punctuation mark, etc.). In another instance, the monitor application 206 could determine whether any set of characters entered by the user matches a regular expression specified by the trigger rule 219.

In either case, the monitor application 206 could then determine whether the identified text associated with the trigger character 109 matches a name of a client application 209 installed on the computing device 203. For example, the monitor application 206 could iterate through the list of installed client applications 209 and determine whether the identified text string matches a string representing a name of an installed client application 209. Assuming that a match is found, the process proceeds to step 313. However, if the identified text fails to match the name of a client application 209, the monitor application 206 may wait Referring to step 313, the monitor application 206 initiates execution of the client application 209 specified using the trigger character 109. For example, the monitor application 206 can request that the operating system of the computing device 203 begin executing a binary application executable corresponding to the name of the client application 209 in the list of installed applications that matches the name of the client application 209 specified using the trigger character 109.

Moving on to step 316, the monitor application 206 can capture data from the first client application 209 which received the trigger character 109. Many different types of data could be captured from the first client application 209. For example, application data such as the thread identifier or process identifier can be captured from the first client application 209. As another example, some or all of the data processed by the first client application 209 could be captured based on the identity of the second client application 209. For example, if a user used a trigger character 109 to open a calendar application, the monitor application 206 could capture event data from the first client application 209. As a second example, if a user entered a trigger character 109 to open an address book application, the monitor application 206 could capture contact information for an individual from the first client application 209. As a third example, if a user entered a trigger character 109 to open a browser, the monitor application 206 could capture a link or uniform resource locator (URL) from the first client application 209. It should be noted that these examples are intended to illustrative and non-limiting—other types of data could be captured by the monitor application 206 as appropriate.

In some instances, the data captured from the first client application 209 could include one or more arguments to be passed to the second client application 209. For example, a browser could be passed a flag to enable private browsing (e.g., disabling browser history, cookies, etc.). As another example, an e-mail application could be passed a flag to encrypt an e-mail for the recipient instead of sending the e-mail in a plaintext form. In a third example, a calendar application could be passed a flag specifying which calendar (e.g., work, personal, etc.) should be loaded. Moreover, multiple flags may be passed to individual client applications 209.

Proceeding next to step 319, the monitor application 206 provides the captured data to the client application 209 specified with the trigger character 109. For example, the monitor application 206 could provide a thread or process identifier to the second client application 209 in order to identify the first client application 209 that was used to invoke execution of the second client application 209. This information could be used, for instance, by the second client application 209 to enable a user to return directly to the first client application 209 once he or she has completed one or more tasks with the second client application 209. For example, once the second client application 209 finishes executing, it could provide the thread or process identifier of the first client application 209 to the operating system of the computing device 203 (e.g., as an argument to an API call) to cause the operating system of the computing device 203 to switch back to executing the first client application 209 once the second client application 209 has finished.

The operating system could determine that the second client application 209 has finished executing in a number of ways. For instance, the operating system could detect a user interaction signaling that the user has finished performing his or her desired task (e.g., selecting files to attach to an email, selecting contacts from an address book for creating a meeting, etc.). The user interaction could include manipulating a portion of the user interface of the second client application 209 (e.g., pressing a button to indicate completion), pressing a button on the computing device 203, or other interaction. In another instance, the operating system could determine that the second client application 209 has finished execution by determining that the second client application 209 has completed execution based on an API call made by the second client application 209 (e.g., due to the second client application 209 invoking the "exit" API function).

In another example, could provide data extracted from the first client application 209 to the second client application 209 in order to prepopulate fields or assist the user in completing a task. For instance, if a user used a trigger character 109 to open a calendar application, the monitor application 206 could supply data captured from the first client application 209 about an event (e.g., meeting, birthday, wedding, appointment, etc.) to the second client application 209 in order to prepopulate one or more data fields in calendar entry. This information could be provided as an argument in a function call used by the first client application 209 to initiate execution of the second client application 209. This information could also be provided using a function provided by an API of the operating system. Alternatively, this information could be provided by saving the data to a file that both the first and second client applications 209 have permissions to access (e.g. applications within the same application group on iOS devices). In another instance, if a user used a trigger character 109 to open an address book application, the monitor application 206 could provide contact information for an individual captured from the first client application 209 to the second client application 209 in order to prepopulate one or more fields in a new contact entry. In a third instance, if a user used a trigger character 109 to open a browser, the monitor application 206 could provide a link or uniform resource locator (URL) captured from the first client application 209 to the second client application 209 in order to automatically create a bookmark or automatically load a web page.

Finally, at step 323, the monitor application 206 can cause the computing device 203 to switch presenting the user interface (e.g., user interface 103a) of the first client application 209 to presenting the user interface (e.g., user interface 103b) of the second client application 209. For example, the monitor application 206 can send a signal to the first client application 209 to suspend execution. As a second example, the monitor application 206 could adjust the priority of the second client application 209 to supersede the priority of the first client application 209. Various other approaches may be used depending on the particular operating system or environment of the computing device 203.

After causing the computing device 203 to switch from presenting the user interface of the first client application 209 to the user interface of the second client application 209, the process ends. Although the computing device 203 may switch back to presenting the user interface of the first client application 209 after a user finishes interacting with the second client application 209, this last context switch is a result of the second client application 209 returning control of the computing device 203 to the first client application 209. For example, the second client application 209 may specify the thread identifier or process identifier provided previously in step 319 as the client application 209 that should resume execution after execution of the second client application 209 terminates.

The flowchart of FIG. 3 shows an example of the functionality and operation of an implementation of portions of the monitor application 206. The described components can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowchart of FIG. 3 shows a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the sequence diagrams can be skipped or omitted. In addition, any number of counters, state variables, warning semaphores, or messages could be added to the logical flow described herein, for purposes of enhanced utility, accounting, performance measurement, or troubleshooting aid. It is understood that all of these variations are within the scope of the present disclosure.

The individual components of the monitoring application 206 can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The monitor application 206, and other components described herein, can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (for example, field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

The above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

Therefore, the following is claimed:

1. A non-transitory computer readable medium comprising machine readable instructions that, when executed by a processor, cause a computing device to at least:
   detect an entry of an individual trigger character in a user interface input field of a first user interface, the first user interface being generated by a first application installed on the computing device, and the user interface input field being specified for detection of the individual trigger character based on a trigger rule for the first application;
   identify a string following the individual trigger character in response to detection of the entry of the individual trigger character;
   determine that the string matches a name of a second application installed on the computing device based on a list of applications installed on the computing device, wherein the name of the second application is included in the list of installed applications;
   execute the second application with the processor of the computing device; and
   display a second user interface generated by the second application.

2. The non-transitory computer readable medium of claim 1, wherein the machine readable instructions, when executed by the processor, further cause the computing device to at least:
   determine a data type of data to capture from the first application based on the name of the second application;
   capture the data from the first application based on the determination of the data type to be captured from the first application; and
   cause the captured data to be accessible to the second application.

3. The non-transitory computer readable medium of claim 1, wherein the machine readable instructions, when executed by the processor, further cause the computing device to at least:
   detect a completion of the execution of the second application; and
   return to an execution of the first application based on the completion of the execution of the second application.

4. The non-transitory computer readable medium of claim 3, wherein the return to the execution of the first application is based on providing a process identifier of the first application to the second application in an instance in which the computing device has initiated the execution of the second application.

5. The non-transitory computer readable medium of claim 3, wherein the detection of the completion of the execution of the second application is based on at least one of a user interaction signaling a task completion or a user-manipulation of a button for the computing device.

6. The non-transitory computer readable medium of claim 1, wherein the display of the second user interface comprises prepopulating the captured data from the first application.

7. The non-transitory computer readable medium of claim 1, wherein the identification of the string is further based on a termination character that is specified by the trigger rule.

8. A system, comprising:
   a computing device comprising a processor and a memory; and
   machine readable instructions stored in the memory that, when executed by the processor, cause the computing device to at least:
      detect an entry of an individual trigger character in a user interface input field of a first user interface, the first user interface being generated by a first application installed on the computing device, and the user interface input field being specified for detection of the individual trigger character based on a trigger rule for the first application;
      identify a string following the individual trigger character in response to detection of the entry of the individual trigger character;
      determine that the string matches a name of a second application installed on the computing device based on a list of applications installed on the computing device, wherein the name of the second application is included in the list of installed applications;
      execute the second application with the processor of the computing device; and
      display a second user interface generated by the second application.

9. The system of claim 8, wherein the machine readable instructions, when executed by the processor, further cause the computing device to at least:
   determine a data type of data to capture from the first application based on the name of the second application;
   capture the data from the first application based on the determination of the data type to be captured from the first application; and
   cause the captured data to be accessible to the second application.

10. The system of claim 8, wherein the string comprises a first string and the machine readable instructions, when executed by the processor, further cause the computing device to at least:
   detect a completion of the execution of the second application; and
   return to an execution of the first application based on the completion of the execution of the second application.

11. The system of claim 10, wherein the return to the execution of the first application is based on providing a process identifier of the first application to the second application in an instance in which the computing device has initiated the execution of the second application.

12. The system of claim 10, wherein the detection of the completion of the execution of the second application is based on at least one of a user interaction signaling a task completion or a user-manipulation of a button for the computing device.

13. The system of claim 8, wherein the display of the second user interface comprises prepopulating the captured data from the first application.

14. The system of claim 8, wherein the identify the string is further based on a termination character that is specified by the trigger rule.

15. A method, comprising:
   detecting, by a computing device, an entry of an individual trigger character in a user interface input field of a first user interface, the first user interface being generated by a first application installed on the computing device, and the user interface input field being specified for detection of the individual trigger character based on a trigger rule for the first application;
   identifying, by the computing device, a string following the individual trigger character in response to detection of the entry of the individual trigger character;
   determining, by the computing device, that the string matches a name of a second application installed on the computing device based on a list of applications installed on the computing device, wherein the name of the second application is included in the list of installed applications;
   causing, by the computing device, the second application to be executed by the computing device; and
   displaying, by the computing device, a second user interface generated by the second application.

16. The method of claim 15, further comprising:
   determining, by the computing device, a data type of data to capture from the first application based on the name of the second application;
   capturing, by the computing device, the data from the first application based on the determination of the data type to be captured from the first application; and
   causing, by the computing device, the captured data to be accessible to the second application.

17. The method of claim 15, further comprising:
   detecting, by the computing device, a completion of the execution of the second application; and
   returning, by the computing device, to an execution of the first application based on the completion of the execution of the second application.

18. The method of claim 15, wherein the return to the execution of the first application is based on providing a process identifier of the first application to the second application in an instance in which the computing device has initiated the execution of the second application.

19. The method of claim 15, wherein the detection of the completion of the execution of the second application is based on at least one of a user interaction signaling a task completion or a user-manipulation of a button for the computing device.

20. The method of claim 15, wherein the display of the second user interface comprises prepopulating the captured data from the first application.

* * * * *